(12) United States Patent
Wang et al.

(10) Patent No.: US 12,136,816 B2
(45) Date of Patent: Nov. 5, 2024

(54) ONLINE VOLTAGE CONTROL METHOD FOR COORDINATING MULTI-TYPE REACTIVE POWER RESOURCES USING REACTIVE VOLTAGE OPERATION CHARACTERISTICS OF POWER GRIDS

(71) Applicants: DEPARTMENT OF ELECTRICAL ENGINEERING, TSINGHUA UNIVERSITY, Beijing (CN); STATE GRID JIBEI ELECTRIC POWER COMPANY LIMITED, Beijing (CN)

(72) Inventors: Bin Wang, Beijing (CN); Guannan Wang, Beijing (CN); Wenchuan Wu, Beijing (CN); Haitao Liu, Beijing (CN); Hongbin Sun, Beijing (CN); Jun Zhang, Beijing (CN); Qinglai Guo, Beijing (CN); Qi Wang, Beijing (CN); Ziang Liu, Beijing (CN)

(73) Assignees: DEPARTMENT OF ELECTRICAL ENGINEERING, TSINGHUA UNIVERSITY, Beijing (CN); STATE GRID JIBEI ELECTRIC POWER COMPANY LIMITED, Beijing (CN)

( * ) Notice: Subject to any disclaimer, the term of this patent is extended or adjusted under 35 U.S.C. 154(b) by 337 days.

(21) Appl. No.: 17/748,535

(22) Filed: May 19, 2022

(65) Prior Publication Data

US 2022/0385072 A1   Dec. 1, 2022

(30) Foreign Application Priority Data

May 20, 2021   (CN) .......................... 202110550498.9

(51) Int. Cl.
*G05B 19/042*   (2006.01)
*H02J 3/18*   (2006.01)
*H02J 3/38*   (2006.01)

(52) U.S. Cl.
CPC .............. *H02J 3/18* (2013.01); *G05B 19/042* (2013.01); *H02J 3/381* (2013.01); *G05B 2219/25357* (2013.01); *G05B 2219/2639* (2013.01); *H02J 2203/10* (2020.01); *H02J 2203/20* (2020.01); *H02J 2300/20* (2020.01)

(58) Field of Classification Search
CPC .......... H02J 3/18; H02J 3/381; H02J 2203/10; H02J 2203/20; H02J 2300/20; H02J 3/50; H02J 3/06; H02J 3/16; G05B 19/042; G05B 2219/25357; G05B 2219/2639; Y02E 40/30; G06F 30/20; G06F 2111/04; G06F 2119/06
See application file for complete search history.

(56) References Cited

U.S. PATENT DOCUMENTS

| | | | |
|---|---|---|---|
| 2016/0063153 A1* | 3/2016 | Guo ...................... | G06F 30/367 703/2 |
| 2017/0133851 A1* | 5/2017 | Wu ........................... | H02J 3/48 |
| 2021/0083480 A1* | 3/2021 | Qiao ....................... | H02J 3/381 |

* cited by examiner

*Primary Examiner* — Darrin D Dunn
*Assistant Examiner* — Marzia T Monty
(74) *Attorney, Agent, or Firm* — Hemisphere Law, PLLC; Zhigang Ma

(57) ABSTRACT

An online voltage control method for coordinating multi-type reactive power resources is provided. First, a linearized power flow equation of branch reactive power is established, and an online voltage control model of multi-type reactive power resources including an objective function and constraint conditions is constructed. The constraint conditions includes generator reactive power constraints, reactive power compensator constraints, transformer tap position constraints, a nodal reactive power balance constraint, and slack contained nodal voltage constraints. Then, an optimization result of voltage control is obtained by solving the model. The method makes full use of reactive voltage operation characteristics of a power grid, constructs a practical online solution model for reactive voltage control of large power grid of coordinating multiple reactive power resources, and under a condition of acceptable accuracy loss, takes in account safety of power grid operation, economy of reactive power resource actions and high reliability of online operation.

1 Claim, No Drawings

ONLINE VOLTAGE CONTROL METHOD FOR COORDINATING MULTI-TYPE REACTIVE POWER RESOURCES USING REACTIVE VOLTAGE OPERATION CHARACTERISTICS OF POWER GRIDS

CROSS REFERENCE OF RELATED APPLICATION

This application claims priority to a Chinese patent application No. 202110550498.9, filed on May 20, 2021. The content of which is incorporated herein by reference in its entirety.

TECHNICAL FIELD

The invention belongs to the field of operation control technologies of power systems, and in particularly to an online voltage control method for coordinating multi-type reactive power resources.

BACKGROUND

The large-scale development of new energy is a national energy strategy, compared with traditional power sources, new energy such as wind and solar energy has strong volatility and uncertainty and access points are generally located at the end of a power grid, the grid structure is relatively weak, voltage fluctuations and even chain off-grids caused by wind and solar power fluctuations are prominent, the voltage problem has become a key bottleneck factor restricting safe connections of large-scale renewable energy to the grid, it is urgent to fully exploit and use reactive voltage resources of the power grid and thereby improve the safety and economic operation level of the power grid of coping with a high proportion of feed-in new energy. Compared with a traditional power grid automatic generation control (AGC), a power grid automatic voltage control (AVC) faces the following key challenges: (1) reactive power-voltage operation has a strong nonlinearity; (2) adjustable resources should consider not only continuous reactive power such as generators, but also discrete reactive power such as capacitors, reactors and transformer taps, with different characteristics and difficult coordination; and (3) there are many nodal voltage constraints that need to be satisfied, and unreasonable voltage constraints may lead to no solution to the original problem, thus affecting the online operation effect.

A reactive voltage control of large-scale power grid for coordinating multiple reactive power resources is essentially a large-scale mixed-integer nonlinear programming problem, but at present there is no efficient and accurate solving method that can meet the requirements of online operation.

SUMMARY

A purpose of the invention purpose is to propose an online voltage control method for coordinating multi-type of reactive power resources, in order to fill a gap in the prior art. The invention makes full use of reactive voltage operation characteristics of a power grid, constructs a practical online solution model for reactive voltage control of a large power grid of coordinating multiple reactive power resources, and under a condition of acceptable accuracy loss, takes in account safety of power grid operation, economy of reactive power resource actions and high reliability of online operation.

Specifically, an embodiment of the invention an online voltage control method for coordinating multi-type reactive power resources, including the following step (1) through step (4).

Step (1), establishing a variable set $\Omega$ of a base-state operation point model of a power system, $$\Omega = \{V_n, V_n^{slack\_up}, V_n^{slack\_down}, \tilde{V}_n, V_i^G, Q_{ij}^b, Q_i^G, Q_n, Q_n^{cp}, Q_n^{un}, Q_n^{ld}, N_{unit}^{cp}, N_{unit}^{rc}, \mu_{unit}, B_i^{cp}, B_j^{rc}, t_i^{adj\_up}, t_i^{adj\_down}\}$$

where, $V_n$ is a voltage after adjustment of a node n, $V_n^{slack\_up}$ and $V_n^{slack\_down}$ respectively are an up slack variable and a down slack variable of the voltage after adjustment of the node n, $\tilde{V}_n$ is an adjustment voltage value after slack of the node n, $V_i^G$ is a voltage of a generator i, $Q_{ij}^b$ is reactive power flowing into a branch b with ports being nodes i and j from the port being the node i, $Q_i^G$ is reactive power of the generator i, $Q_n$ is reactive power of the node n, $Q_n^{cp}$ is reactive power supplied by a reactive power compensator connected to the node n, $Q_n^{un}$ is reactive power supplied by a generator connected to the node n, $Q_n^{ld}$ is reactive power absorbed by a load connected to the node n, $N_{unit}^{cp}$ is a number of capacitance compensators (also referred to as capacitive compensators) in a state of being put in operation under a controller unit, $N_{unit}^{rc}$ is a number of inductance compensators (also referred to as inductive compensators) in a state of being put in operation under the controller unit, $\mu_{unit}$ is a binary variable of the controller unit, $B_i^{cp}$ is a Boolean variable of a capacitance compensator i to indicate the capacitance compensator numbered with i whether changes its operation state, $B_j^{rc}$ is a Boolean variable of an inductance compensator j to indicate the inductance compensator numbered with j whether changes its operation state, $t_i^{adj\_up}$ is an upwards adjusted tap position of a transformer i, and $t_i^{adj\_down}$ is a downwards adjusted tap position of the transformer i.

Step (2), establishing a linearized equation of reactive power of branch, specifically:

for each the branch b, calculating a Jacobi matrix of reactive power of the branch to obtain the following values:

$$\frac{\partial Q_{ij}^b}{\partial V_i}, \frac{\partial Q_{ij}^b}{\partial V_j}, \frac{\partial Q_{ji}^b}{\partial V_i}, \frac{\partial Q_{ji}^b}{\partial V_j}, \frac{\partial Q_{ij}^b}{\partial t}, \frac{\partial Q_{ji}^b}{\partial t};$$

where, i and j are node numbers respectively corresponding to two ports of the branch b, $$\frac{\partial Q_{ij}^b}{\partial V_i}$$

is a partial derivative of reactive power of the branch b flowing out from the port node j relative to a voltage $V_i$ after adjustment of the port node i, $$\frac{\partial Q_{ij}^b}{\partial V_j}$$

is a partial derivative of the reactive power of the branch b flowing out from the port node j relative to a voltage $V_j$ after adjustment of the port node j, $$\frac{\partial Q_{ji}^b}{\partial V_i}$$

is a partial derivative of reactive power of the branch b flowing out from the port node i relative to the voltage $V_i$ after adjustment of the port node i, $$\frac{\partial Q_{ji}^b}{\partial V_j}$$

is a partial derivative of the reactive power of the branch b flowing out from the port node i relative to the voltage $V_j$ after adjustment of the port node j, $$\frac{\partial Q_{ij}^b}{\partial t}$$

is a partial derivative of the reactive power of the branch b flowing out from the port node j relative to a tap position t of a transformer connected to the branch b, and $$\frac{\partial Q_{ji}^b}{\partial t}$$

is a partial derivative of the reactive power of the branch b flowing out from the port node i relative to the tap position t of the transformer connected to the branch b;

an expression of the linearized equation of reactive power of the branch b is as follows:

$$Q_{ij}^b = Q_{ij0}^b + \frac{\partial Q_{ji}^b}{\partial V_i} \cdot (V_i - V_{i0}) + \frac{\partial Q_{ji}^b}{\partial V_j} \cdot (V_j - V_{j0}) + \frac{\partial Q_{ji}^b}{\partial t} \cdot (t - t_0)$$

where, $Q_{ij}^b$ is the reactive power flowing into the branch b from the port node i, $Q_{ij0}^b$ is an initial reactive power flowing into the branch b from the port node i, $V_{i0}$ is an original voltage of the node i, $V_{j0}$ is an original voltage of the node j, t is a tap position after adjustment of the transformer connected to the branch b, and $t_0$ is an original tap position of the transformer connected to the branch b.

Step (3), establishing an online voltage control model of multi-type reactive power resources, the online voltage control model including an objective function and constraint conditions; specifically, it may include the following sub-step (3-1) and sub-step (3-2).

Sub-step (3-1), establishing an expression of the objective function of the online voltage control model as follows:

$\min C_{total}$, wherein, $C_{total} = \Sigma(Q_n^{cp,op} \cdot C_n^{cp,op}) + \Sigma(Q_n^{un,adj\_up} \cdot C_n^{un,adj\_up} + Q_n^{un,adj\_down} \cdot C_n^{un,adj\_down}) + \Sigma(t_i^{adj\_up} + t_i^{adj\_down}) \cdot C_i^{t,adj} + \Sigma(V_n^{slack\_up^2} + V_n^{slack\_down^2}) \cdot C_p$, where, $C_{total}$ is a sum of a total cost and a penalty term of regulation, $Q_n^{cp,op}$ is a 0-1 variable of the reactive power compensator connected to the node n whether is put in operation, $C_n^{cp,op}$ is a cost of the reactive power compensator connected to the node n in operation, $Q_n^{un,adj\_up}$ is an amount of upward adjustment of output reactive power of the generator connected to node n, $C_n^{un,adj\_up}$ is a cost of upward adjustment of output reactive power of the generator connected to node n, $Q_n^{un,adj\_down}$ is an amount of downward adjustment of output reactive power of the generator connected to node n, $C_n^{un,adj\_down}$ is a cost of downward adjustment of output reactive power of the generator connected to node n, $C_i^{t,adj}$ is a cost per unit tap position of adjustment of the transformer i, $\Sigma(V_n^{slack\_up^2} + V_n^{slack\_down^2}) \cdot C_p$ is the penalty term, and $C_p$ is a penalty coefficient of slack variable.

Sub-step (3-2), establishing the constraint conditions shown by (3-2-1) through (3-2-5) as follows.

(3-2-1) Generator Reactive Power Constraints:

when the $Q_i^G$ is adjustable, there is a constraint condition:

$Q_i^{G\_min} \leq Q_i^G \leq Q_i^{G\_max}, \forall_i \in I^G$, where, $Q_i^{G\_min}$ is a lower limit of the reactive power of the generator i, $Q_i^{G\_max}$ is an upper limit of the reactive power of the generator i, and $I^G$ is a collection of generators;

when the $Q_i^G$ is non-adjustable and the generator i is a PQ node (whose real power P and reactive power Q are specified, i.e., the PQ node is a node with specified real power and reactive power), there is a constraint condition: $Q_i^G = Q_{i0}^G$, when the $Q_i^G$ is non-adjustable and the generator i is a PV node (whose real power P and a voltage magnitude V are specified, i.e., the PV node is a node with specified real power and voltage magnitude), there is a constraint condition: $V_i^G = V_{i0}^G$, where, $Q_{i0}^G$ and $V_{i0}^G$ respectively are original reactive power and an original voltage of the generator i.

(3-2-2) Reactive Power Compensator Constraints:

$N_{unit}^{cp} = N_{unit}^{cp0} + \Sigma_{i \in I_0} B_i^{cp} - \Sigma_{i \in I_1} B_i^{cp}$, where, the controller is a minimum control unit of a group of reactive power compensators, the group of reactive power compensators comprise capacitance compensators and inductance compensators, $I_0$ is a capacitance compensator set in exit state under the controller unit, $I_1$ is a capacitance compensator set in the state of being put in operation under the controller unit, $N_{unit}^{cp0}$ is a number of the capacitance compensators in the state of being put in operation under the controller unit at an initial stage;

$N_{unit}^{rc} = N_{unit}^{rc0} + \Sigma_{j \in J_0} B_j^{rc} - \Sigma_{j \in J_1} B_j^{rc}$, where, $J_0$ is an inductance compensator set in exit state under the controller unit, $J_1$ is an inductance compensator set in the state of being put in operation under the controller unit, $N_{unit}^{rc0}$ is a number of the inductance compensators in the state of being put in operation under the controller unit at the initial stage;

using a big-M method to establish a constraint as follows:

$$\begin{cases} 0 \leq N_{unit}^{cp} \leq \mu_{unit} N_{unit}^{sum} \\ 0 \leq N_{unit}^{rc} \leq (1 - \mu_{unit}) N_{unit}^{sum} \\ \mu_{unit} = 0, 1 \end{cases}$$

where, $N_{unit}^{sum}$ is a number of all the reactive power compensators under the controller unit.

(3-2-3) Slack Contained Nodal Voltage Constraints:

$$\begin{cases} \tilde{V}_n = V_n + V_n^{slack\_up} - V_n^{slack\_down} \\ V_n^{slack\_up}, V_n^{slack\_down} \geq 0 \end{cases},$$

when a voltage on the node n has upper and lower limit constraints, there is a constraint condition:

$$V_n^{min} \leq \tilde{V}_n \leq V_n^{max},$$

when the voltage on the node n has an objective voltage value, there is a constraint condition:

$$\tilde{V}_n = V_n^{obj},$$

where, $V_n^{min}$ is an allowable minimum value of the voltage on the node n, $V_n^{max}$ is an allowable maximum value of the voltage on the node n, and $V_n^{obj}$ is the objective voltage value of the node n.

(3-2-4) Transformer Tap Position Constraints:
when a tap of the transformer i is adjustable, there is a constraint condition:

$$\begin{cases} t_i^{min} \leq t_i^0 + t_i^{adj\_up} - t_i^{adj\_down} \leq t_i^{max} \\ 0 \leq t_i^{adj\_up}, t_i^{adj\_down} \leq 2 \end{cases}$$

where, $t_i^{min}$ is a minimum value of the tap position of the transformer i, $t_i^{max}$ is a maximum value of the tap position of the transformer i, and $t_i^0$ is an original value of the tap position of the transformer i.

(3-2-5) a Nodal Reactive Power Balance Constraint:

$$Q_n = \Sigma Q_n^{cp} + \Sigma Q_n^{un} - \Sigma Q_n^{ld} - \Sigma_j Q_{nj}^b = 0,$$

where, $\Sigma Q_n^{cp}$ is a sum of reactive power flowing in the node n from all the reactive power compensators connected to the node n, $\Sigma Q_n^{un}$ is a sum of reactive power flowing in the node n from all generators connected to the node n, $\Sigma Q_n^{ld}$ is a sum of reactive power of flowing from the node n into all loads connected to the node n, $\Sigma_j Q_{nj}^b$ is a sum of reactive power of flowing from the node n into all branches each with the node n as its port, and $Q_{nj}^b$ is calculated by the linearized equation of reactive power of branch established in the step (2).

Step (4), solving the online voltage control model of multi-type reactive power resources established in the step (3) to obtain optimal values of respective optimization variables contained in the variable set $\Omega$, thereby completing the voltage control.

The invention may have features and beneficial effects as follows.

The invention provides an online voltage control method for coordinating multi-type reactive power resources. First, a power grid state is made Taylor expansion at current state point, to construct a linearized power flow equation of reactive power of branch; and then an online voltage control model of multi-type reactive power resources is constructed. Optimization objectives of quadratic type as established may include: adjustment cost of generator reactive power, cost of capacitive reactor put in operation and switching, adjustment cost of transformer tap position and penalty cost of nodal voltage slack variable. Constraints as determined may include: nodal voltage constraint, generator reactive power constraint, reactive power compensator constraints, transformer tap position constraints, and nodal reactive power balance constraints. Special operation constraints of discrete reactive resources are considered in the constraints, and nodal voltage slack variables are introduced to improve the computational convergence, which finally form a mixed-integer quadratic programming (MIQP) problem.

(1) the power grid state is made Taylor expansion at current state point, to construct the linearized power flow equation of reactive power of branch, so that an original nonlinear problem is transformed into a linearized model that meets the requirements of online practicality.

(2) a concept of capacitor-inductor controller (also referred to as control unit) of is introduced, each controller can contain multiple capacitors and inductors, and in the same control unit, the capacitor and the inductor cannot be put in operation at the same time; and moreover, the Big-M modeling method is introduced to establish the special operation constraints of the capacitor-inductor controller to thereby determine a given strategy of capacitor-inductor put in operation and switching meets on-site operation requirements.

(3) the nodal slack variables are introduced to change "hard constraint" of original nodal voltage into "soft constraint", and the penalty term of slack variables is put into the objective function. When the original voltage exceeds limits, it tries to pull the voltage back into a limit range, and meanwhile avoids no solution to the original problem caused by unreasonable voltage constraints, thereby can improve the convergence of online operation of the method.

(4) the invention makes full use of reactive voltage operation characteristics of a power grid, constructs a practical online solution model for reactive voltage control of a large power grid of coordinating multiple reactive power resources, and under a condition of acceptable accuracy loss, takes in account safety of power grid operation, economy of reactive power resource actions and high reliability of online operation.

DETAILED DESCRIPTION OF EMBODIMENT

An embodiment of the invention provides an online voltage control method for coordinating multi-type reactive power resources. The online voltage control method may include the following step (1) through step (4).

Step (1), establishing a variable set $\Omega$ of a base-state operation point model of a power system, $$\Omega = \{V_n, V_n^{slack\_up}, V_n^{slack\_down}, \tilde{V}_n, V_i^G, Q_{ij}^b, Q_i^G, Q_n, \\ Q_n^{cp}, Q_n^{un}, Q_n^{ld}, N_{unit}^{cp}, N_{unit}^{rc}, \mu_{unit}, B_i^{cp}, \\ B_j^{rc}, t_i^{adj\_up}, t_i^{adj\_down}\}$$

where, $V_n$ is a voltage after adjustment of a node n, $V_n^{slack\_up}$ and $V_n^{slack\_down}$ respectively are an up slack variable and a down slack variable of the voltage after adjustment of the node n, $\tilde{V}_n$ is an adjustment voltage value after slack of the node n, $V_i^G$ is a voltage of a generator i, $Q_{ij}^b$ is reactive power flowing into a branch b with ports being nodes i and j from the port being the node i, $Q_i^G$ is reactive power of the generator i, $Q_n$ is reactive power of the node n, $Q_n^{cp}$ is reactive power supplied by a reactive power compensator connected to the node n, $Q_n^{un}$ is reactive power supplied by a generator connected to the node n, $Q_n^{ld}$ is reactive power absorbed by a load connected to the node n, $N_{unit}^{cp}$ is a number of capacitance compensators in a state of being put in operation under a controller unit, $N_{unit}^{rc}$ is a number of inductance compensators in a state of being put in operation under the controller unit, $\mu_{unit}$ is a binary variable of the controller unit, $B_i^{cp}$ is a Boolean variable of a capacitance compensator i to indicate the capacitance compensator numbered with i whether changes its operation state, $B_j^{rc}$ is a Boolean variable of an inductance compensator j to indicate the inductance compensator numbered with j whether changes its operation state, $t_i^{adj\_up}$ is an upwards adjusted tap position of a transformer i, and $t_i^{adj\_down}$ is a downwards adjusted tap position of the transformer i.

Step (2), establishing a linearized equation of reactive power of branch, specifically:

for each the branch b, calculating a Jacobi matrix of reactive power of the branch to obtain the following values:

$$\frac{\partial Q_{ij}^b}{\partial V_i}, \frac{\partial Q_{ij}^b}{\partial V_j}, \frac{\partial Q_{ji}^b}{\partial V_i}, \frac{\partial Q_{ji}^b}{\partial V_j}, \frac{\partial Q_{ij}^b}{\partial t}, \frac{\partial Q_{ji}^b}{\partial t};$$

where, i and j are node numbers respectively corresponding to two ports of the branch b, $$\frac{\partial Q_{ij}^b}{\partial V_i}$$

is a partial derivative of reactive power of the branch b flowing out from the port node j relative to a voltage $V_i$ after adjustment of the port node i, $$\frac{\partial Q_{ij}^b}{\partial V_j}$$

is a partial derivative of the reactive power of the branch b flowing out from the port node j relative to a voltage $V_j$ after adjustment of the port node j, $$\frac{\partial Q_{ji}^b}{\partial V_i}$$

is a partial derivative of reactive power of the branch b flowing out from the port node i relative to the voltage $V_i$ after adjustment of the port node i, $$\frac{\partial Q_{ji}^b}{\partial V_j}$$

is a partial derivative of the reactive power of the branch b flowing out from the port node i relative to the voltage $V_j$ after adjustment of the port node j, $$\frac{\partial Q_{ij}^b}{\partial t}$$

is a partial derivative of the reactive power of the branch b flowing out from the port node j relative to a tap position t of a transformer connected to the branch b, and $$\frac{\partial Q_{ji}^b}{\partial t}$$

is a partial derivative of the reactive power of the branch b flowing out from the port node i relative to the tap position t of the transformer connected to the branch b;

Because voltage variations of respective nodes in the power grid are relatively small, variations of reactive power caused by the variations of nodal voltages can be approximately linear. Similarly, a change of the transformer tap position generally does not exceed two positions (gears), and a caused variation of reactive power can also be approximately linear. Therefore, a relationship between the reactive power on the branch b and voltages at both ends of the branch and the transformer tap position can be obtained as follows:

$$Q_{ij}^b = Q_{ij0}^b + \frac{\partial Q_{ji}^b}{\partial V_i} \cdot (V_i - V_{i0}) + \frac{\partial Q_{ji}^b}{\partial V_j} \cdot (V_j - V_{j0}) + \frac{\partial Q_{ji}^b}{\partial t} \cdot (t - t_0)$$

where, $Q_{ij}^b$ is the reactive power flowing into the branch b with ports being i and j from the port node i (i.e., the reactive power flowing out of the node i), $Q_{ij0}^b$ is an initial reactive power flowing into the branch b with the ports being i and j from the port node i, $V_i$ is a voltage value after adjustment of the node i, $V_{i0}$ is an original voltage of the port node i, $V_j$ is a voltage value after adjustment of the node j, $V_{j0}$ is an original voltage of the port node j, $$\frac{\partial Q_{ij}^b}{\partial t}$$

is the partial derivative of the reactive power of the branch b flowing out from the port node j relative to the tap position t of the transformer connected to the branch b, t is a tap position after adjustment of the transformer connected to the branch b, and $t_0$ is an original tap position of the transformer connected to the branch b.

Step (3), establishing an online voltage control model of multi-type reactive power resources, the online voltage control model including an objective function and constraint conditions; specifically, it may include the following sub-step (3-1) and sub-step (3-2).

Sub-step (3-1), establishing an expression of the objective function of the online voltage control model as follows:

$minC_{total}$, wherein, $C_{total}=\Sigma(Q_n^{cp,op} \cdot C_n^{cp,op})+\Sigma(Q_n^{un,adj\_up} \cdot C_n^{un,adj\_up}+Q_n^{un,adj\_down} \cdot C_n^{un,adj\_down})+ \Sigma(t_i^{adj\_up}+t_i^{adj\_down}) \cdot C_i^{t,adj}+\Sigma(V_n^{slack\_up^2}+V_n^{slack\_down^2}) \cdot C_p$, where, $C_{total}$ is a sum of a total cost and a penalty term of regulation (adjustment), $Q_n^{cp,op}$ is a 0-1 variable of the reactive power compensator connected to the node n whether is put in operation, $C_n^{cp,op}$ is a cost of the reactive power compensator connected to the node n in operation, $Q_n^{un,adj\_up}$ is an amount of upward adjustment of output reactive power of the generator connected to node n, $C_n^{un,adj\_up}$ is a cost of upward adjustment of output reactive power of the generator connected to node n, $Q_n^{un,adj\_down}$ is an amount of downward adjustment of output reactive power of the generator connected to node n, $C_n^{un,adj\_down}$ is a cost of downward adjustment of output reactive power of the generator connected to node n, $C_i^{t,adj}$ is a cost per unit tap position of adjustment of the transformer i, $\Sigma(V_n^{slack\_up^2}+V_n^{slack\_down^2}) \cdot C_p$ is the penalty term, and $C_p$ is a penalty coefficient of slack variable.

The penalty coefficient $C_p$ generally takes a large number such as $10_8$, and therefore, if the final optimization objective result has a relatively large order of magnitude, it indicates that the optimization objective has not been achieved, and a feasible solution close to the objective value is obtained Sub-step (3-2), establishing the constraint conditions shown by (3-2-1) through (3-2-5) as follows.

(3-2-1) Generator Reactive Power Constraints:
when the $Q_i^G$ is adjustable, there is a constraint condition:

$$Q_i^{G\_min} \leq Q_i^G \leq Q_i^{G\_max}, \forall_i \in I^G,$$

where, $Q_i^{G\_min}$ is a lower limit of the reactive power of the generator i, $Q_i^{G\_max}$ is an upper limit of the reactive power of the generator i, and $I^G$ is a collection of generators;
when the $Q_i^G$ is non-adjustable and the generator i is a PQ node (i.e., a node with specified rea power P and reactive power Q), there is a constraint condition: $Q_i^G = Q_{i0}^G$,
when the $Q_i^G$ is non-adjustable and the generator i is a PV node (i.e., a node with specified real power P and voltage magnitude V), there is a constraint condition: $V_i^G = V_{i0}^G$,
where, $Q_{i0}^G$ and $V_{i0}^G$ respectively are original reactive power and an original voltage of the generator i.

(3-2-2) Reactive Power Compensator Constraints:
The controller is defined as the minimum control unit of a group of reactive power compensators (including capacitance compensators and inductance compensators). Generally, one plant with reactive power compensators is one controller. The capacitance compensator and the inductance compensator cannot be put into operation at the same time under the same controller, otherwise oscillation will occur in the power grid;

$$N_{unit}^{cp} = N_{unit}^{cp0} + \Sigma_{i \in I_0} B_i^{cp} - \Sigma_{i \in I_1} B_i^{cp},$$

where, $I_0$ is a capacitance compensator set in exit state under the controller unit, $I_1$ is a capacitance compensator set in the state of being put in operation under the controller unit, $N_{unit}^{cp0}$ is a number of the capacitance compensators in the state of being put in operation under the controller unit at an initial stage, $B_i^{cp}$ is the Boolean variable of the capacitance compensator i to indicate the capacitance compensator numbered with i whether changes its operation state, and if the capacitance compensator numbered with i is non-adjustable, $B_i^{cp} = 0$;

$$N_{unit}^{rc} = N_{unit}^{rc0} + \Sigma_{j \in J_0} B_j^{rc} - \Sigma_{j \in J_1} B_j^{rc},$$

where, $J_0$ is a reactance compensator set in exit state under the controller unit, $J_1$ is a reactance compensator set in the state of being put in operation under the controller unit, $N_{unit}^{rc0}$ is a number of the reactance compensators in the state of being put in operation under the controller unit at the initial stage, $B_j^{rc}$ is the Boolean variable of the inductance compensator j to indicate the inductance compensator numbered with j whether changes its operation state, and if the inductance compensator numbered with j in non-adjustable, $B_j^{rc} = 0$;

In the same controller, the capacitance compensator and the inductance compensator cannot be put into operation at the same time, otherwise oscillation will occur; and therefore using a big-M method to establish a constraint as follows:

$$\begin{cases} 0 \leq N_{unit}^{cp} \leq \mu_{unit} N_{unit}^{sum} \\ 0 \leq N_{unit}^{rc} \leq (1 - \mu_{unit}) N_{unit}^{sum} \\ \mu_{unit} = 0, 1 \end{cases}$$

where, $N_{unit}^{sum}$ is a number of all the reactive power compensators under the controller unit, and $\mu_{unit}$ is a binary variable; as a result, it can be realized that at most one of $N_{unit}^{cp}$ and $N_{unit}^{rc}$ is greater than 0.

(3-2-3) Slack Contained Nodal Voltage Constraints:

$$\begin{cases} \tilde{V}_n = V_n + V_n^{slack\_up} - V_n^{slack\_down} \\ V_n^{slack\_up}, V_n^{slack\_down} \geq 0 \end{cases},$$

when a voltage on the node n has upper and lower limit constraints, there is a constraint condition: $V_n^{min} \leq \tilde{V}_n \leq V_n^{max}$,
when the voltage on the node n has an objective voltage value, there is a constraint condition: $\tilde{V}_n = V_n^{obj}$,
where, $V_n^{min}$ is an allowable minimum value of the voltage on the node n, $V_n^{max}$ is an allowable maximum value of the voltage on the node n, and $V_n^{obj}$ is the objective voltage value of the node n; after adding the slack variables, an unreachable optimization objective can still be solved, and a result relatively close to the optimization objective can be obtained.

(3-2-4) Transformer Tap Position Constraints:
when a tap of the transformer i is adjustable, there are constraint conditions:

$$\begin{cases} t_i^{min} \leq t_i^0 + t_i^{adj\_up} - t_i^{adj\_down} \leq t_i^{max} \\ 0 \leq t_i^{adj\_up}, t_i^{adj\_down} \leq 2 \end{cases}$$

where, $t_i^{min}$ is a minimum value of the tap position of the transformer i, $t_i^{max}$ is a maximum value of the tap position of the transformer i, $t_i^0$ is an original value of the tap position of the transformer i, $t_i^{adj\_up}$ is the upwards adjusted tap position of the transformer i, and $t_i^{adj\_down}$ is the downwards adjusted tap position of the transformer i. Since the tap position adjustment cannot adjust multiple gears at one time in actual, both $t_i^{adj\_up}$ and $t_i^{adj\_down}$ are set as cannot exceed 2.

(3-2-5) a Nodal Reactive Power Balance Constraint:
for any one node, input reactive power should be equal to output reactive power, and thus: $Q_n = \Sigma Q_n^{cp} + \Sigma Q_n^{un} - \Sigma Q_n^{ld} - \Sigma_j Q_{nj}^b = 0$,
where, $Q_n$ is the reactive power of the node n, $\Sigma Q_n^{cp}$ is a sum of reactive power flowing in the node n from all the reactive power compensators connected to the node n, $\Sigma Q_n^{un}$ is a sum of reactive power flowing in the node n from all generators connected to the node n, $\Sigma Q_n^{ld}$ is a sum of reactive power of flowing from the node n into all loads connected to the node n, $\Sigma_j Q_{nj}^b$ is a sum of reactive power of flowing from the node n into all branches each with the node n as its port, and $Q_{nj}^b$ is calculated by the linearized equation of reactive power of branch established in the step (2).

Step (4), Optimizing and Solving:
the established above online voltage control model of multi-type reactive power resources can be solved by Cplex, and optimal solutions of respective optimization variables contained in the variable set $\Omega$ are finally obtained, and the voltage control is completed.

What is claimed is:
1. An online voltage control method for coordinating multi-type reactive power resources, comprising steps:
(1) establishing a variable set $\Omega$ of a base-state operation point model of a power system, wherein

$$\Omega = \{V_n, V_n^{slack_{up}}, V_n^{slack_{down}}, \tilde{V}_n, V_i^G, Q_{ij}^b, Q_i^G, Q_n, Q_n^{cp}, Q_n^{un}, Q_n^{ld}, N_{unit}^{cp}, N_{unit}^{rc}, \mu_{unit}, B_i^{cp}, B_j^{rc}, t_i^{adj\_up}, t_i^{adj\_down}\}$$

where, $V_n$ is a voltage after adjustment of a node n, $V_n^{slack\_up}$ and $V_n^{slack\_down}$ respectively are an up slack variable and a down slack variable of the voltage after adjustment of the node n, $\tilde{V}_n$ is an adjustment voltage value after slack of the node n, $V_i^G$ is a voltage of a generator i, $Q_{ij}^b$ is reactive power flowing into a branch b with ports being nodes i and j from the port being the node i, $Q_i^G$ is reactive power of the generator i, $Q_n$ is reactive power of the node n, $Q_n^{cp}$ is reactive power supplied by a reactive power compensator connected to the node n, $Q_n^{un}$ is reactive power supplied by a generator connected to the node n, $Q_n^{ld}$ is reactive power absorbed by a load connected to the node n, $N_{unit}^{cp}$ is a number of capacitance compensators in a state of being put in operation under a controller unit, $N_{unit}^{rc}$ is a number of inductance compensators in a state of being put in operation under the controller unit, $\mu_{unit}$ is a binary variable of the controller unit, $B_i^{cp}$ is a Boolean variable of a capacitance compensator i to indicate the capacitance compensator numbered with i whether changes its operation state, $B_j^{rc}$ is a Boolean variable of an inductance compensator j to indicate the inductance compensator numbered with j whether changes its operation state, $t_j^{adj\_up}$ is an upwards adjusted tap position of a transformer i, and $t_i^{adj\_down}$ is a downwards adjusted tap position of the transformer i;

(2) establishing a linearized equation of reactive power of branch, comprising:

for each the branch b, calculating a Jacobi matrix of reactive power of the branch to obtain the following values:

$$\frac{\partial Q_{ij}^b}{\partial V_i}, \frac{\partial Q_{ij}^b}{\partial V_j}, \frac{\partial Q_{ji}^b}{\partial V_i}, \frac{\partial Q_{ji}^b}{\partial V_j}, \frac{\partial Q_{ij}^b}{\partial t}, \frac{\partial Q_{ji}^b}{\partial t};$$

where, i and j are node numbers respectively corresponding to two ports of the branch b, $$\frac{\partial Q_{ij}^b}{\partial V_i}$$

is a partial derivative of reactive power of the branch b flowing out from the port node j relative to a voltage $V_i$ after adjustment of the port node i, $$\frac{\partial Q_{ij}^b}{\partial V_j}$$

is a partial derivative of the reactive power of the branch b flowing out from the port node j relative to a voltage $V_j$ after adjustment of the port node j, $$\frac{\partial Q_{ji}^b}{\partial V_i}$$

is a partial derivative of reactive power of the branch b flowing out from the port node i relative to the voltage $V_i$ after adjustment of the port node i, $$\frac{\partial Q_{ji}^b}{\partial V_j}$$

is a partial derivative of the reactive power of the branch b flowing out from the port node i relative to the voltage $V_j$ after adjustment of the port node j, $$\frac{\partial Q_{ij}^b}{\partial t}$$

is a partial derivative of the reactive power of the branch b flowing out from the port node j relative to a tap position t of a transformer connected to the branch b, and $$\frac{\partial Q_{ji}^b}{\partial t}$$

is a partial derivative of the reactive power of the branch b flowing out from the port node i relative to the tap position t of the transformer connected to the branch b;

an expression of the linearized equation of reactive power of the branch b is as follows:

$$Q_{ij}^b = Q_{ij0}^b + \frac{\partial Q_{ji}^b}{\partial V_i} \cdot (V_i - V_{i0}) + \frac{\partial Q_{ji}^b}{\partial V_j} \cdot (V_j - V_{j0}) + \frac{\partial Q_{ji}^b}{\partial t} \cdot (t - t_0)$$

where, $Q_{ij}^b$ is the reactive power flowing into the branch b from the port node i, $Q_{ij0}^b$ is an initial reactive power flowing into the branch b from the port node i, $V_{i0}$ is an original voltage of the node i, $V_{j0}$ is an original voltage of the node j, t is a tap position after adjustment of the transformer connected to the branch b, and $t_0$ is an original tap position of the transformer connected to the branch b;

(3) establishing an online voltage control model of multi-type reactive power resources, wherein the online voltage control model comprises an objective function and constraint conditions, specifically comprising the following steps:

(3-1) establishing an expression of the objective function of the online voltage control model as follows:
$minC_{total}$,
wherein $minC_{total}$, wherein, $C_{total} = \Sigma(Q_n^{cp,op} \cdot C_n^{cp,op}) + \Sigma(Q_n^{un,adj\_up} \cdot C_n^{un,adj\_up} + Q_n^{un,adj\_down} \cdot C_n^{un,adj\_down}) + \Sigma(t_i^{adj\_up} + t_i^{adj\_down}) \cdot C_i^{t,adj} + \Sigma(V_n^{slack\_up^2} + V_n^{slack\_down^2}) \cdot C_p$, where, $C_{total}$ is a sum of a total cost and a penalty term of regulation, $Q_n^{cp,op}$ is a 0-1 variable of the reactive power compensator connected to the node n whether is put in operation, $C_n^{cp,op}$ is a cost of the reactive power compensator connected to the node n in operation, $Q_n^{un,adj\_up}$ is an amount of upward adjustment of output reactive power of the generator connected to node n, $C_n^{un,adj\_up}$ is a cost of upward adjustment of output reactive power of the generator connected to node n, $Q_n^{un,adj\_down}$ is an amount of downward adjustment of output reactive power of the generator connected to node n, $C_n^{un,adj\_down}$ is a cost of downward adjustment of output reactive power of the generator connected to node n, $C_i^{t,adj}$ is a cost per unit tap position of adjustment of the transformer i, $\Sigma(V_n^{slack\_up^2} + V_n^{slack\_down^2}) \cdot C_p$ is the penalty term, and $C_p$ is a penalty coefficient of slack variable;

(3-2) establishing the constraint conditions as follows:

(3-2-1) generator reactive power constraints:

when the QC is adjustable, there is a constraint condition:

$$Q_i^{G\_min} \leq Q_i^G \leq Q_i^{G\_max}, \forall_i \in I^G,$$

where, $Q_i^{G\_min}$ is a lower limit of the reactive power of the generator i, $Q_i^{G\_max}$ is an upper limit of the reactive power of the generator i, and IG is a collection of generators;

when the $Q_i^G$ is non-adjustable and the generator i is a PQ node whose real power P and reactive power Q are specified, there is a constraint condition: $Q_i^G = Q_{i0}^G$;

when the $Q_i^G$ is non-adjustable and the generator i is a PV node whose real power P and a voltage magnitude V are specified, there is a constraint condition: $V_i^G = V_{i0}^G$, where, $Q_{i0}^G$ and $V_{i0}^G$ respectively are original reactive power and an original voltage of the generator i;

(3-2-2) reactive power compensator constraints:

$$N_{unit}^{cp} = N_{unit}^{cp0} + \Sigma_{i \in I_0} B_i^{cp} - \Sigma_{i \in I_1} B_i^{cp},$$

where, the controller is a minimum control unit of a group of reactive power compensators, the group of reactive power compensators comprise capacitance compensators and inductance compensators, $I_0$ is a capacitance compensator set in exit state under the controller unit, $I_1$ is a capacitance compensator set in the state of being put in operation under the controller unit, $N_{unit}^{cp0}$ is a number of the capacitance compensators in the state of being put in operation under the controller unit at an initial stage;

$$N_{unit}^{rc} = N_{unit}^{rc0} + \Sigma_{j \in J_0} B_j^{rc} - \Sigma_{j \in J_1} B_j^{rc},$$

where, $J_0$ is an inductance compensator set in exit state under the controller unit, $J_1$ is an inductance compensator set in the state of being put in operation under the controller unit, $N_{unit}^{rc0}$ is a number of the inductance compensators in the state of being put in operation under the controller unit at the initial stage;

using a big-M method to establish a constraint as follows:

$$\begin{cases} 0 \leq N_{unit}^{cp} \leq \mu_{unit} N_{unit}^{sum} \\ 0 \leq N_{unit}^{rc} \leq (1 - \mu_{unit}) N_{unit}^{sum} \\ \mu_{unit} = 0, 1 \end{cases}$$

where, $N_{sum}^{unit}$ is a number of all the reactive power compensators under the controller unit;

(3-2-3) slack contained nodal voltage constraints:

$$\begin{cases} \tilde{V}_n = V_n + V_n^{slack\_up} - V_n^{slack\_down} \\ V_n^{slack\_up}, V_n^{slack\_down} \geq 0 \end{cases},$$

when a voltage on the node n has upper and lower limit constraints, there is a constraint condition:

$$V_n^{min} \leq \tilde{V}_n \leq V_n^{max},$$

when the voltage on the node n has an objective voltage value, there is a constraint condition:

$$\tilde{V}_n = V_n^{obj},$$

where, $V_n^{min}$ is an allowable minimum value of the voltage on the node n, $V_n^{max}$ is an allowable maximum value of the voltage on the node n, and $V_n^{obj}$ is the objective voltage value of the node n;

(3-2-4) transformer tap position constraints:

when a tap of the transformer i is adjustable, there is a constraint condition:

$$\begin{cases} t_i^{min} \leq t_i^0 + t_i^{adj\_up} - t_i^{adj\_down} \leq t_i^{max} \\ 0 \leq t_i^{adj\_up}, t_i^{adj\_down} \leq 2 \end{cases}$$

where, $t_i^{min}$ is a minimum value of the tap position of the transformer i, $t_i^{max}$ is a maximum value of the tap position of the transformer i, and to is an original value of the tap position of the transformer i;

(3-2-5) a nodal reactive power balance constraint:

$$Q_n = \Sigma Q_n^{cp} + \Sigma Q_n^{un} - \Sigma Q_n^{ld} - \Sigma_j Q_{nj}^b = 0,$$

where, $\Sigma Q_n^{cp}$ is a sum of reactive power flowing in the node n from all the reactive power compensators connected to the node n, $\Sigma Q_n^{un}$ is a sum of reactive power flowing in the node n from all generators connected to the node n, $\Sigma Q_n^{ld}$ is a sum of reactive power of flowing from the node n into all loads connected to the node n, $\Sigma_j Q_{nj}^b$ is a sum of reactive power of flowing from the node n into all branches each with the node n as its port, and $Q_{nj}^b$ is calculated by the linearized equation of reactive power of branch established in the step (2);

(4) solving the online voltage control model of multi-type reactive power resources established in the step (3) to obtain optimal values of respective optimization variables contained in the variable set $\Omega$;

wherein the method further comprises the following steps:

performing the voltage control on the power system based on the obtained optimal values of respective optimization variables contained in the variable set $\Omega$, which comprises: adjusting the voltage and the reactive power of the node n to the respective optimal values, adjusting the voltage and the reactive power of the generator i to the respective optimal values, adjusting the reactive power supplied by the reactive power compensator connected to the node n to the respective optimal value, adjusting the reactive power supplied by the generator i connected to the node n to the respective optimal value, adjusting the reactive power absorbed by the load connected to the node n to the respective optimal value, adjusting the number of the capacitance compensators in the state of being put in operation under the controller unit to the respective optimal value, adjusting the number of the inductance compensators in the state of being put in operation under the controller unit to the respective optimal value, and adjusting the upwards adjusted tap position and the downwards adjusted tap position of the transformer i to the respective optimal values.

* * * * *